United States Patent [19]
Redder et al.

[11] 4,437,564
[45] Mar. 20, 1984

[54] CONVEYOR DRIVE FRAME

[75] Inventors: Manfred Redder, Bergkamen-Oberaden; Horst Linke; Dieter Gründken, both of Lunen; Helmut Temme, Waltrop, all of Fed. Rep. of Germany

[73] Assignee: Gewerkschaft Eisenhutte Westfalia, Fed. Rep. of Germany

[21] Appl. No.: 443,834

[22] Filed: Nov. 22, 1982

Related U.S. Application Data

[63] Continuation of Ser. No. 198,081, Oct. 17, 1980, abandoned.

[30] Foreign Application Priority Data

Oct. 24, 1979 [DE] Fed. Rep. of Germany ....... 2942916

[51] Int. Cl.[3] .............................................. B65G 23/02
[52] U.S. Cl. .................................... 198/834; 198/735; 474/165
[58] Field of Search .............. 198/834, 728, 733, 725, 198/735; 474/96, 164, 165, 902, 903

[56] References Cited

U.S. PATENT DOCUMENTS

| 3,213,703 | 10/1965 | Fitzgerald | 198/834 X |
| 4,037,713 | 7/1977 | Soliman et al. | 198/834 X |

FOREIGN PATENT DOCUMENTS 606773  5/1978  U.S.S.R. .............................. 198/834

*Primary Examiner*—Jeffrey V. Nase
*Attorney, Agent, or Firm*—Sughrue, Mion, Zinn, Macpeak and Seas

[57] ABSTRACT

A drive frame for a scraper-chain conveyor comprises a pair of generally parallel side plates. A pair of aligned bearing bushes rotatably support a drive shaft of a chain drum. The bearing bushes are mounted in apertures in the side plates. The bearing bushes are welded to their respective side plates, thereby strengthening the drive frame.

9 Claims, 3 Drawing Figures

CONVEYOR DRIVE FRAME

This is a continuation of application Ser. No. 198,081, filed Oct. 17, 1980 now abandoned.

BACKGROUND OF THE INVENTION

1. Field of the Invention

This invention relates to a drive frame for a scraper-chain conveyor.

2. Description of the Prior Art

It is known to provide a conveyor drive frame with a drive assembly having a shaft mounted in bearings carried by the two side plates of the drive frame. The shaft passes through, and drivably engages within, a chain drum, which is rotatably mounted between the side plates. The chain drum transfers drive, from a drive unit flanged to one of the side plates to the scraper assembly of the conveyor, via the shaft. Scraper-chain conveyors are used in underground mining operations for removing won mineral material, for example coal, from a longwall working. The drive unit used to drive such a conveyor is very heavy, so the drive frame is subjected to extremely heavy loads. Moreover, a drive unit for the plough (or other winning machine) may also be flanged to one of the side plates of the drive frame, in which case the drive frame is subjected to even greater loads. Such loads may be so great as to bend the drive frame in the region where the chain drum is mounted, this being the weakest region, since it is not possible to reinforce this region with transverse struts or the like. (DE-As No. 1 227 669 and DE-OS No. 2 709 414 describe typical arrangements of this type).

The aim of the invention is to provide a conveyor drive frame which does not suffer from the disadvantages of the known drive frames.

SUMMARY OF THE INVENTION

The present invention provides a drive frame for a scraper-chain conveyor, the drive frame comprising a pair of generally parallel side plates, and a pair of aligned bearing bushes for rotatably supporting the drive shaft of a chain drum, the bearing bushes being mounted in apertures in the side plates, wherein the bearing bushes are welded to their respective side plates.

Advantageously, a respective roller bearing is associated with each of the bearing bushes, each side plate having a wall thickness which is greater than the width of the roller bearing associated with the bearing bush welded to that side plate.

Since the bearing bushes are welded to the side plates of the drive frame, they contribute to the rigidisation of the side plates, so that the stability of the drive frame as a whole is increased. At the same time, the drive frame is relatively simple to manufacture.

The drive frame can be further strengthened by increasing the wall thickness of the side plates. Preferably, this is achieved by ensuring that the axial dimension of each bearing bush is at least equal to the wall thickness of the associated side plate.

Advantageously, the inner axial end face of each bearing bush is substantially coplanar with the inner surface of the associated side plate. In this way, the drive frame can be used for scraper-chain conveyors having either central or outboard chains, the bearing bushes not projecting beyond the inner surfaces of the side plates.

If the bearing bushes project beyond the outer surfaces of the side plates, they should do so only slightly, that is to say by no more than half (and preferably only about one third) of the wall thickness of the side plates. This relatively slight degree of projection of the bearing bushes enables a drive unit for the conveyor and/or build-on parts (such as a plough box) to be located close to the drive frame. Moreover, a winning machine (such as a plough) can move right alongside the drive frame without its guiding having to be angled to an excessive extent away from the drive frame.

Advantageously, each bearing bush is provided with a radially outwardly extending collar at the outer axial end thereof. Preferably, where the axial dimension of each bearing bush is slightly greater than the wall thickness of the associated side plate, the outer surface of each of the side plates is provided with a recess which surrounds the aperture in that side plate, each of the recesses engaging with the collar of the associated bearing bush. This enhances the stability of the drive frame when the heavy drive unit for the conveyor is connected thereto.

Preferably, each bearing bush is provided with an axially outwardly extending flange at the peripheral edge of its collar, each of the recesses is circular, and each of said flanges has first and second portions, the first portion being circular and engaging within the associated recess, and the second portion projecting from the said recess and having a substantially rectangular peripheral shape whose outline is larger than that of said recess. The second portions of the flanges each constitute a mount for the gear housing of the drive unit, or for a centering plate to which the gear housing can be flanged. Drive can, therefore, be transmitted to the drive shaft from either side. Moreover, a cover plate can be inserted into the second portion of one of the flanges to close off that end of the drive shaft if drive is not required from that side.

The invention also provides a drive station for a scraper-chain conveyor, the drive station comprising a drive frame and a drive assembly mounted within the drive frame, the drive frame comprising a pair of generally parallel side plates, and the drive assembly comprising a drive shaft and a hollow chain drum surrounding the shaft and in drivable engagement therewith, the drive shaft being rotatably supported in bearing bushes mounted in apertures in the side plates, and the chain drum being positioned between the side plates, wherein the bearing bushes are welded to their respective side plates.

BRIEF DESCRIPTION OF THE DRAWINGS

A conveyor drive frame constructed in accordance with the invention will now be described by way of example, with reference to the accompanying drawings, in which.

DESCRIPTION OF PREFERRED EMBODIMENT

Figure 1:
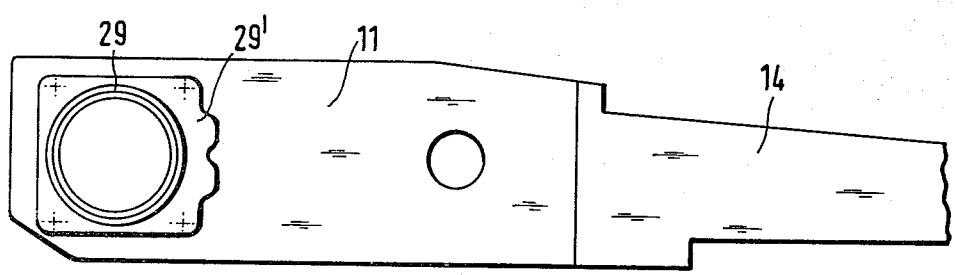
FIG. 1 is a side elevation of the drive frame.

Referring to the drawings, the drive frame of a scraper-chain conveyor (not shown) has a pair of parallel side plates 10 and 11, which are connected together by a welded-in floor plate 12 to form a stable frame that cannot twist. Transverse struts 13 (see FIG. 3) may also be provided to interconnect the side plates 10 and 11.

The channel sections (not shown) of the scraper-chain conveyor are connected to the drive frame via an intermediate channel section 14 which is bolted to the drive frame.

A chain drum 15 is rotatably mounted between the side plates 10 and 11 of the drive frame, the chain drum 15 being drivably connected to a shaft 21 whose ends are supported by respective cup-shaped bearing bushes 17 positioned within circular apertures 16 formed in the side plates. The bearing bushes 17 are of similar construction, and are welded to the side plates 10 and 11, the weld seams being designated 18 (inner weld seams) and 19 (outer weld seams) in FIG. 3. The portions of the bearing bushes 17 positioned within the apertures 16 match the shape and size of these apertures. Consequently, the welded-in bearing bushes 17 strengthen the side plates 10 and 11.

Each bearing bush 17 accommodates a respective roller bearing 20, the roller bearings supporting the ends of the shaft 21. The chain drum 15 is constituted by two semi-cylindrical parts 22 which are detachably connected to one another and to the shaft 21. Each drum part 22 is provided with two sprocket halves, the sprocket halves of the two drum parts combining to form complete sprockets. As shown in full lines in FIG. 3, the chain drum 15 may have a pair of outboard sprockets 23. Alternatively, as shown in dash-dot lines in FIG. 3, the chain drum may have a central, double sprocket wheel 24. The annular gaps between the end faces of the chain drum 15 and the inwardly-facing surfaces 25 of the side plates 10 and 11 are sealed, in known manner, by means of metal slide rings 26. The slide rings 26 are held in position by means of resilient washers (not shown).

Each of the side plates 10 and 11 has the same thickness X, this thickness being greater than the overall width Y of each of the roller bearings 20. The axial dimension of each of the bearing bushes 17 is slightly greater than the wall-thickness X of the side plates 10 and 11. The inwardly-facing surfaces 27 of the bearing bushes 17 lie substantially flush with the inwardly-facing surfaces 25 of the side plates 10 and 11, so that there is sufficient space for fitting the sprockets 23 for a double outboard, chain-driven, scraper-chain conveyor. Thus, the other ends of the bearing bushes 17 project slightly beyond the outwardly-facing surfaces 28 of the side plates 10 and 11. This amount of projection Z is preferably less than about $\frac{1}{3}$ X, and so is considerably less than Y.

At its outer end, each bearing bush 17 has a flange (or collar) 29 whose thickness is greater than the dimension Z. Each collar 29 mates with a respective, circular recess 30 formed in the outwardly-facing surface 28 of the corresponding side plate 10 or 11. The portions 29' of the collars 29 that project beyond the side plate surfaces 28, however, define a generally rectangular outline (see FIG. 1). A gear housing 32 of the conveyor drive (not shown) is flanged onto one of these rectangular mounting surfaces 29', by way of a centering plate 31. The other mounting surface 29' is closed off by a cover plate 35, which is housed within a recess 37 formed within the projecting portion of that collar 29, and secured thereto by bolts 36. The cover plate 35 is, therefore, housed completely within the bearing bush 17.

Figure 3:
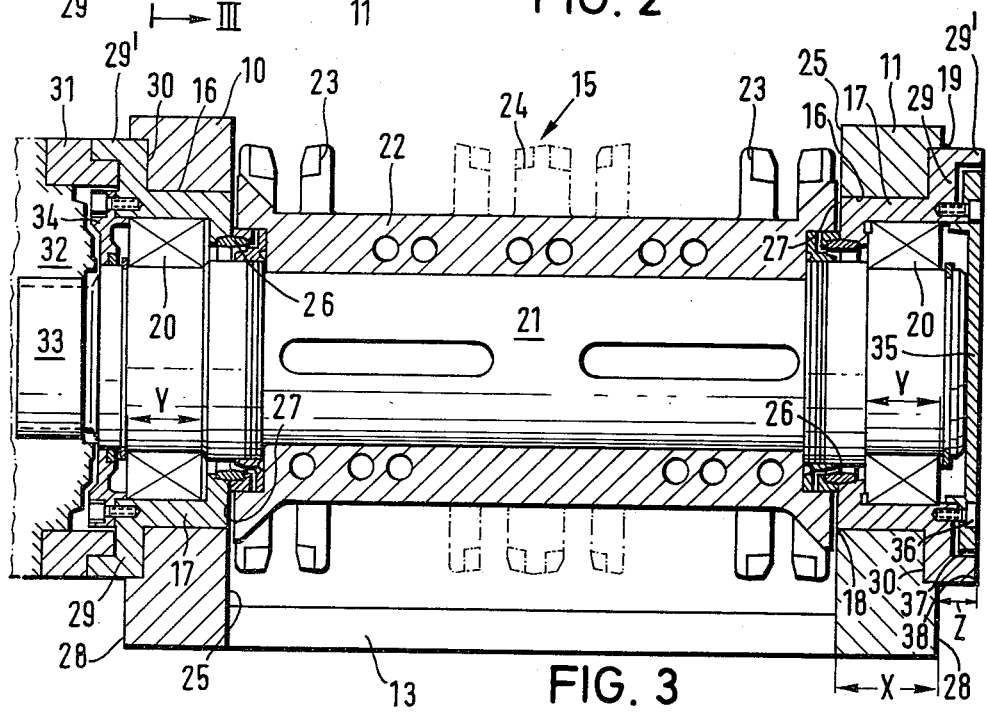
FIG. 3 is a cross-section taken along the line III—III of FIG. 2.

As shown in FIG. 3, the shaft 21 has an externally-toothed end portion 33, which meshes with an internally-toothed gear output shaft (not shown). The roller bearing 20 at this end of the assembly is held in place by a locking ring 34, which is bolted to the adjacent bearing bush 17.

Figure 2:
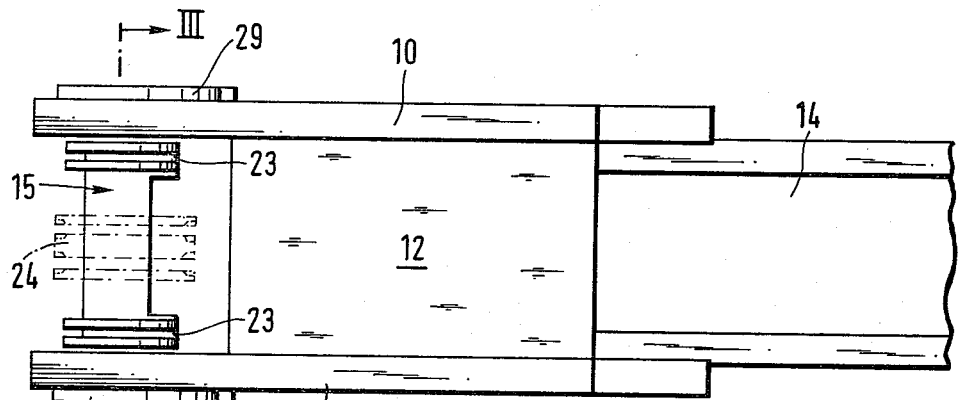
FIG. 2 is a plan view of the drive frame.

For the purpose of clarity, FIGS. 1 and 2 show the drive frame without its centering plate 31 or its gear housing 32. It will be appreciated that these items can be optionally positioned at either side of the drive frame, so that the chain drum 15 can be driven from either side.

We claim:

1. A drive frame for a scraper-chain conveyor, comprising:
    a pair of generally parallel side plates;
    a chain drum and a drive shaft therefor;
    a pair of aligned bearing bushes rotatably supporting said drive shaft of said chain drum, said bearing bushes being mounted in apertures in said side plates and being welded to said side plates, respectively, an inner axial end face of each bearing bush being substantially coplanar with an inner surface of said respective side plate and having a radially outwardly extending collar at an outer axial end thereof, an axial dimension of each of said bearing bushes being slightly greater than a wall thickness of said respective side plate, each of said side plates having an outer surface with a recess which surrounds said aperture in that side plate, each of said recesses engaging said collar of said associated bearing bush, each of said bearing bushes having an axially outwardly extending flange at a peripheral edge of its collar; and
    a pair of roller bearings for said bearing bushes, a width of said roller bearings being less than said wall thickness of said respective side plates.

2. A drive frame according to claim 1, wherein said bearing bushes are of identical construction.

3. A drive frame according to claim 1, wherein an axial dimension of each bearing bush is at least equal to said wall thickness of said respective side plate.

4. A drive frame according to claim 1, wherein each of said recesses of said side plates is circular, and wherein each of said collars of said bearing bushes has first and second portions, said first portion being circular and being engagable within said associated recess, and said second portion projecting from said recess and having a substantially rectangular peripheral shape whose outline is larger than that of said recess.

5. A drive frame according to claim 1, wherein said chain drum is hollow, surrounds said drive shaft, and is in drivable engagement therewith, said chain drum being positioned between said side plates.

6. A drive frame according to claim 1 further comprising a pair of slide rings for sealing a gap formed between end faces of said chain drum and said inner axial end faces of said bearing bushes.

7. A drive frame for a scraper-chain conveyor, comprising:
    a pair of generally parallel side plates;
    a chain drum and a drive shaft therefor;
    a pair of aligned bearing bushes rotatably supporting said drive shaft of said chain drum, said bearing bushes being mounted in apertures in said side plates and being welded to said side plates, respectively, an inner axial end face of each bearing bush being substantially coplanar with an inner surface of said respective side plate and having a radially outwardly extending collar at an outer axial end thereof, an axial dimension of each of said bearing bushes being slightly greater than a wall thickness of said respective side plate, each of said side plates having an outer surface with a recess which surrounds said aperture in that side plate, each of said recesses engaging said collar of said associated bearing bush, each of said bearing bushes having an axially outwardly extending flange at a peripheral edge of its collar;

a pair of roller bearings for said bearing bushes, a width of said roller bearings being less than said wall thickness of said respective side plates;

said bearing bushes being of identical construction, each of said recesses of said side plates being circular, and wherein each of said collars of said bearing bushes has first and second portions, said first portion being circular and being engageable within said associated recess, and said second portion projecting from said recess and having a substantially rectangular peripheral shape whose outline is larger than that of said recess.

8. A drive frame according to claim 7, wherein said chain drum is hollow, surrounds said drive shaft, and is in drivable engagement therewith, said chain drum being positioned between said side plates.

9. A drive frame for a scraper-chain conveyor, comprising:

a pair of generally parallel side plates;

a chain drum and a drive shaft therefor;

a pair of aligned bearing bushes rotatably supporting said drive shaft of said chain drum, said bearing bushes being mounted in apertures in said side plates and being welded to said side plates, respectively, an inner axial end face of each bearing bush being substantially coplanar with an inner surface of said respective side plate and having a radially outwardly extending collar at an outer axial end thereof, an axial dimension of each of said bearing bushes being slightly greater than a wall thickness of said respective side plate, each of said side plates having an outer surface with a recess which surrounds said aperture in that side plate, each of said recesses engaging said collar of said associated bearing bush, each of said bearing bushes having an axially outwardly extending flange at a peripheral edge of its collar;

a pair of roller bearings for said bearing bushes, a width of said roller bearings being less than said wall thickness of said respective side plates;

said chain drum being hollow, surrounding said drive shaft, and being in drivable engagement therewith, said chain drum being positioned between said side plates;

said axial dimension of each of said bearing bushes exceeding said wall thickness of said respective side plate by no more than one-third of said wall thickness of said respective plate.

* * * * *